Aug. 19, 1958 W. E. SAXE 2,848,097
VARIABLE SPEED TRANSMISSION
Filed Aug. 24, 1954 3 Sheets-Sheet 1

INVENTOR.
WALTER E. SAXE
BY HIS ATTORNEYS.
HARRIS, KIECH, FOSTER & HARRIS

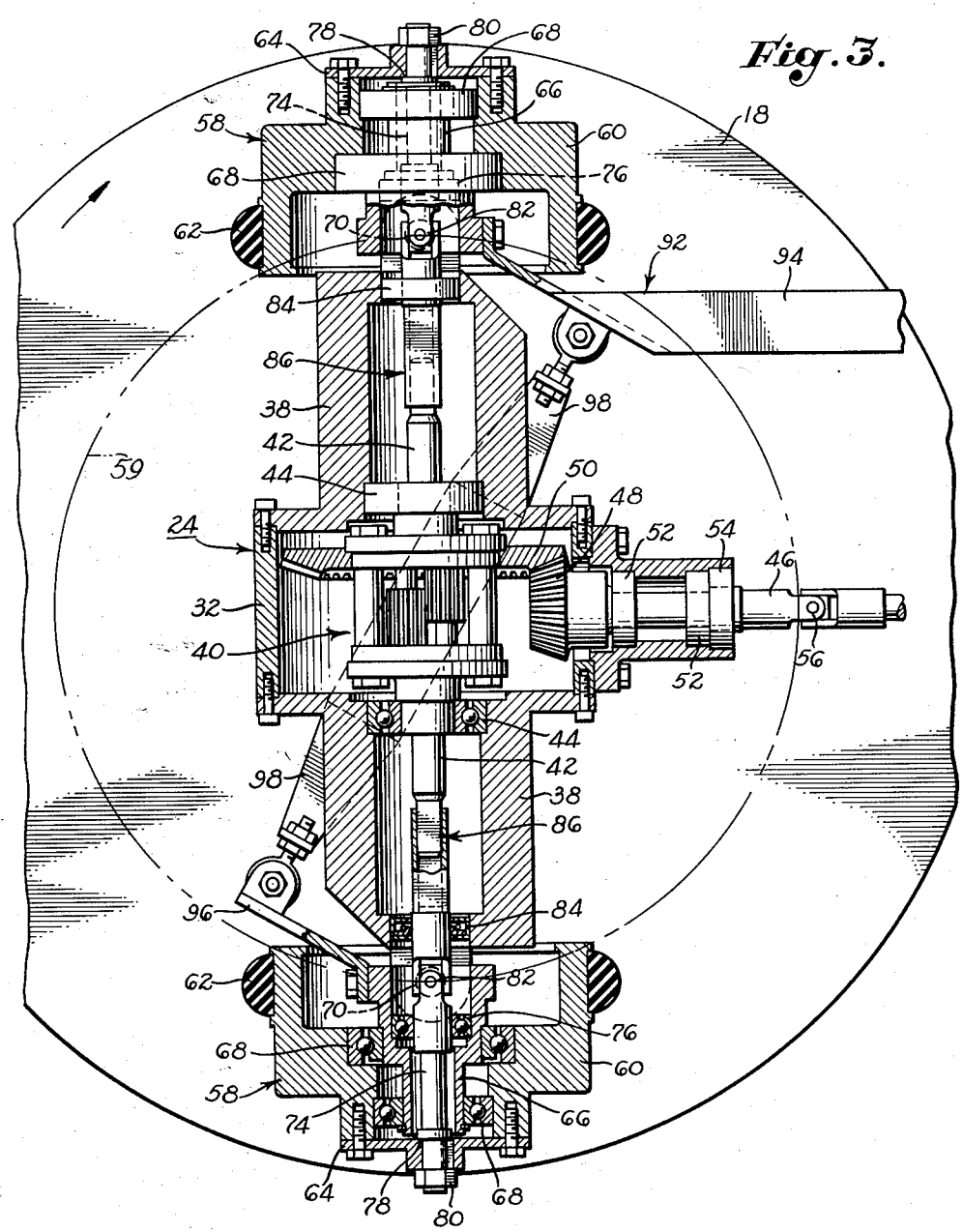

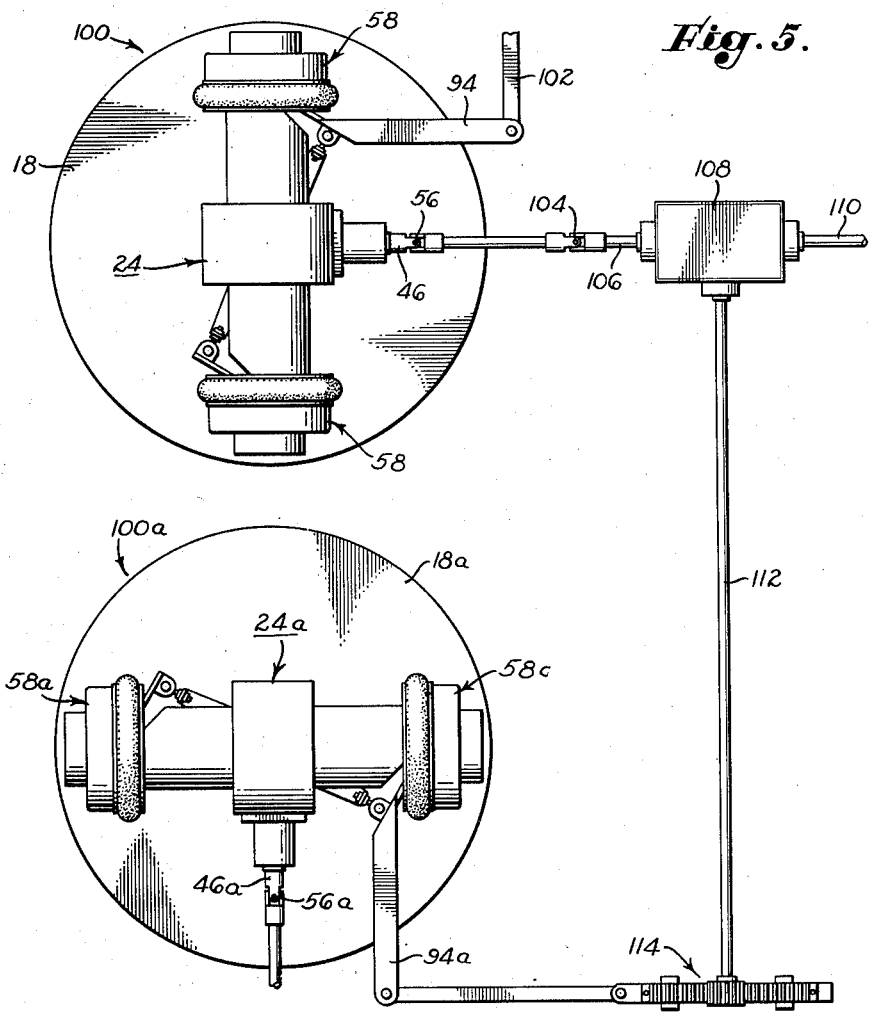

United States Patent Office 2,848,097
Patented Aug. 19, 1958

2,848,097

VARIABLE SPEED TRANSMISSION

Walter E. Saxe, Pasadena, Calif., assignor to The Conveyor Company, Los Angeles, Calif., a corporation of California Application August 24, 1954, Serial No. 451,873

21 Claims. (Cl. 198—39)

The present invention relates fundamentally to a variable speed transmission capable of producing an infinite number of speed ratios, and is susceptible of a wide variety of applications, as will appear hereinafter.

In general, the variable speed transmission of the invention includes a rotor, preferably a plane, or substantially plane, disc rotating about a vertical axis, across which is movable a differential housing containing differential gearing having an output shaft and two input shafts to which are connected wheels engaging the rotor on opposite sides of the axis of rotation thereof. As will be apparent, as long as the two wheels are equidistant from the axis of rotation of the rotor, the two wheels, and the two input shafts, rotate at the same speed so that the output shaft is stationary. However, if the differential housing is moved transversely of the rotor so that the two wheels are different distances from the axis of rotation of the rotor, the speeds of rotation of the two wheels and input shafts will differ to produce rotation of the output shaft due to the characteristic differentiating action of the differential gearing. As will be apparent, an infinite number of speed ratios between the rotor and the output shaft may be attained, the speed ratio being different from each position of the differential housing relative to the rotor.

The primary object of the present invention is to provide a variable speed transmission of the foregoing general character wherein the differential housing, the differential gearing and the two wheels are movable transversely of the rotor in the manner hereinbefore indicated, and wherein such transverse movement is effected by steering both of the wheels mentioned, a related object being to provide a steering means which is displaceable by an input force and which toes the wheels inwardly toward each other in one direction or the other, depending on the direction of steering, so that both wheels always have the same relation to the rotor.

With the foregoing construction, any displacement of the steering means changes the angles which the steerable wheels make with circles concentric about the axis of rotation of the rotor, with the result that side thrusts are applied to the steerable wheels to shift the entire differential-wheel assembly transversely of the rotor until such assembly arrives at a new position wherein the steerable wheels are tangent to circles concentric with the axis of rotation of the rotor, the direction of movement of the differential-wheel assembly and the amount of such movement depending upon the direction and magnitude of the steering-means displacement. The net result of all of this is that the differential-wheel assembly constantly seeks a position such that the rotational speed of the output shaft is always proportional to the magnitude of the steering-means displacement, the direction of rotation of the output shaft depending upon the direction of the steering-means displacement, this being an important feature of the invention.

In its fundamental aspects, the invention may be utilized simply as a variable speed transmission, the direction of rotation of, and the speed of rotation of, the output shaft of which are dependent on the direction of, and the magnitude of, the steering means displacement. Perhaps more broadly, the invention may be utilized as a transducer for converting a displacement into a rotary motion, the direction and speed of such motion being dependent upon the direction of, and the magnitude of, such displacement. Still more broadly, the invention is capable of converting into a rotary motion any variable which is in itself a displacement, or which may be converted into one, the direction and speed of such rotary motion again being dependent upon the direction and magnitude of the variable. More specifically, the invention may be utilized as an integrator for integrating one or more variables. For example, one variable may be the steering displacement of the steering means, and another variable may be introduced by making the speed of rotation of the rotor proportional thereto, or some function thereof. More than two variables may also be introduced, as will appear hereinafter.

The foregoing objects, advantages and features of the present invention, together with various other objects, advantages and features thereof which will become apparent, may be attained with the exemplary embodiments of the invention which are illustrated in the accompanying drawings and which are described in detail hereinafter. Referring to the drawings:

Fig. 3 is an enlarged, fragmentary sectional view taken along the arrowed line 3—3 of Fig. 2;

Fig. 5 is a diagrammatic view illustrating one possible application of the variable speed transmission of the invention; and Fig. 6 is a diagrammatic view illustrating another possible application of the variable speed transmission of the invention.

Figure 1:
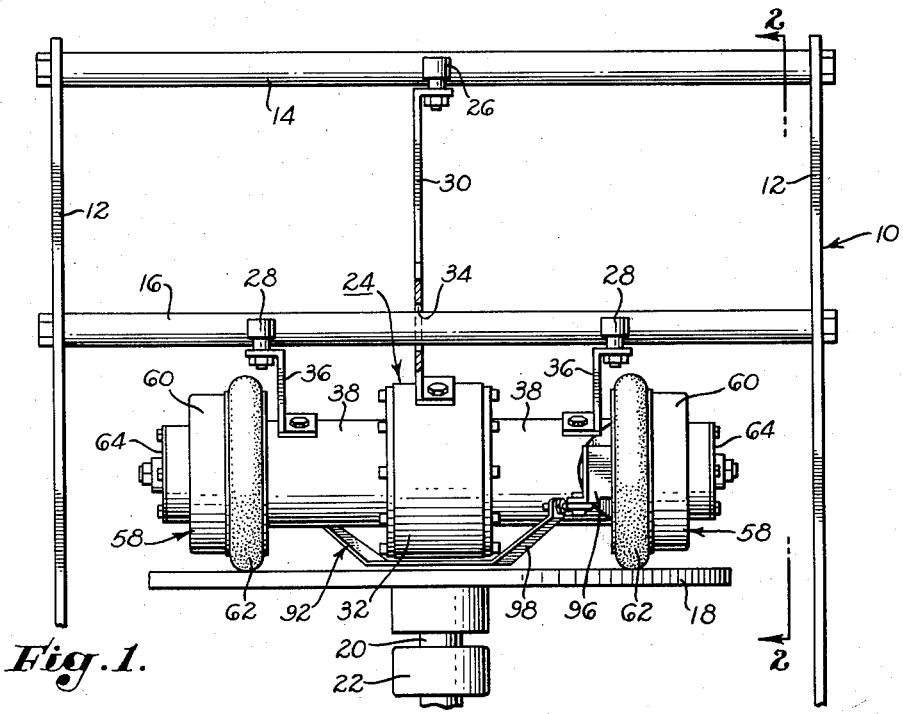
Fig. 1 is an elevational view of a variable speed transmission which embodies the invention.
Figure 2:
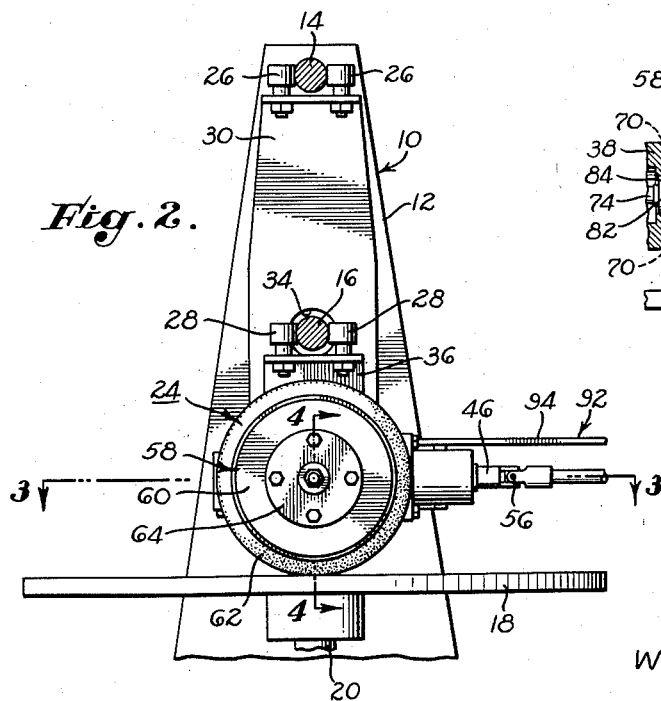
Fig. 2 is a sectional view taken along the arrowed line 2—2 of Fig. 1.

Referring particularly to Figs. 1 to 3 of the drawings, the numeral 10 designates a frame of any suitable construction, the frame being shown as including standards 12 interconnected by cylindrical bars 14 and 16 which perform a function to be discussed hereinafter. Mounted on the frame 10 and in any suitable manner, not specifically shown, is a rotor 18 on a shaft 20 carried by a bearing 22, the rotor being shown as a plane disc or turntable rotatable about a vertical axis.

Carried by the rotor or turntable 18 is a differential-wheel assembly 24 which is movable transversely of the turntable 18 along a path perpendicular to and intersecting the axis of rotation of the turntable. The assembly 24 is guided for such transverse movement by a guiding means which includes a pair of rollers 26 embracing the cylindrical bar 14 and pairs of rollers 28 embracing the cylindrical bar 16, the cylindrical bars 14 and 16 thus serving as tracks which are followed by the rollers 26 and 28 to guide the assembly 24 along the desired path. The rollers 26 are mounted on a standard 30 which is mounted on a differential housing 32, the standard 30 having an opening 34 therethrough to receive the lower bar 16. The rollers 28 are mounted on standards 36 which are mounted on axial extensions 38 of the differential housing 32.

Referring particularly to Fig. 3 of the drawings, the assembly 24 includes differential gearing, designated generally by the numeral 40, disposed in the differential housing 32 and having input shafts 42 extending into the respective extensions 38. The differential gearing 40 and the input shafts 42 are carried by bearings 44 in the extensions 38. The differential gearing 40 also includes an output shaft 46 carrying a pinion gear 48 meshed with a ring gear 50, the output shaft being carried by bearings 52. A seal 54 prevents the escape of lubricant from the differential housing 32 along the output shaft 46. Provided in the output shaft 46 is a universal joint 56 to enable the output shaft 46 to drive some stationary means, as discussed hereinafter, while the assembly 24 moves transversely of the turntable 18.

Figure 4:
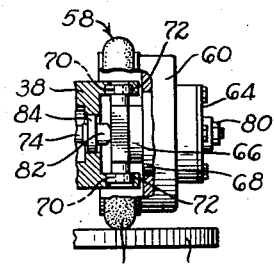
Fig. 4 is a fragmentary sectional view taken along the arrowed line 4—4 of Fig. 2.

Pivotally mounted on the outer ends of the extensions 38 are steerable wheels 58 which include, in the particular construction illustrated, cup-shaped members 60 encircled by tires 62 engaging the turntable 18. The cup-shaped members 60 are closed by removable plates 64. The wheels 58 are rotatably mounted on tubular axles 66 by means of bearings 68, the axles 66 being pivotally connected to the extensions 38 by kingpins 70 mounted in bearings 72 on the extensions 38. As best shown in Fig. 4 of the drawings, the pivot axes for the wheels 58 provided by the kingpins 70 lie in the central planes of the tires 62 for minimum steering resistance, which is an important feature.

Rigidly connected to the wheels 58 are shafts 74 mounted in bearings 76 within the tubular axles 66, the shafts 74 being rigidly connected to the cover plate 64 of the wheels 58 by clamping such cover plates between shoulders 78 on the shafts and nuts 80 threaded onto the shafts. The shafts 74 are provided intermediate their ends with universal joints 82 located on the pivot axes provided by the kingpins 70, the shafts 74 extending through lubricant seals 84 into the differential housing extensions 38. At their inner ends, the shafts 74 are connected to the respective input shafts 42 of the differential gearing 40 by means of torque-transmitting connections 86 which permit axial relative movement of the shafts 42 and 74. In the particular construction illustrated, each connection 86 includes a square socket in the corresponding shaft 74 adapted to receive a square end of the corresponding input shaft 42. As will be apparent, the connections 86 provide for axial relative movement of the shafts 42 and 74 to permit steering of the wheels 58.

The invention includes means 92 for steering the wheels 58, the steering means 92 including, in the particular construction illustrated, a steering arm 94 connected to one of the tubular axles 66 at the inner end thereof. A steering arm 96 is similarly connected to the inner end of the other tubular axle 66, and the two steering arms 94 and 96 are interconnected by a tie rod 98 pivotally connected thereto. As will be noted, the steering arms 94 and 96 are out of phase by 180° so that the wheels 58, when steered, toe inwardly toward each other regardless of the direction in which they are steered. The purpose of such toe-in is to provide the same relations between the wheels 58 and their respective circles of engagement with the turntable 18 resulting from turntable rotation.

Considering the operation of the variable speed transmission of the invention, it will be apparent that, if the steering arm 94 is in its neutral position, the assembly 24 occupies a position relative to the turntable 18 such that the wheels 58 are equidistant from the axis of rotation of the turntable, the wheels thus having coinciding circular lines of engagement 59, Fig. 3, with the turntable. Consequently, under such conditions, the output shaft 46 is stationary.

However, if the steering arm 94 is displaced in either direction from its neutral position by an unbalanced steering force, the wheels 58 are pivoted to cause them to make acute angles with their respective circles of engagement with the turntable, such angles being identical because of the toe-in produced by the steering means 92. Consequently, side thrusts are imposed on the wheels 58 in much the same manner as side thrusts are imposed on the front wheels of a conventional automobile whenever the front wheels of the automobile are steered in one direction or the other to make acute angles with their lines of engagement with the roadway. Since the wheels 58 are rotated in opposite directions by the turntable 18 and since the steering means 92 toes the wheels in toward each other, the resulting side thrusts on the wheels act in the same direction and such side thrusts result in transverse movement of the assembly 24 relative to the turntable 18 until the steering force applied to the steering arm 94 is balanced so that the wheels 58 are again tangent to their respective circles of engagement with the turntable 18. Under such conditions, the wheels 58 are no longer equidistant from the axis of rotation of the turntable 18, with the result that the output shaft 46 is now rotated, the direction of rotation of the output shaft depending upon the direction of the displacement of the steering arm 94, and the speed of rotation of the output shaft depending upon the magnitude of such displacement. As will be apparent, for each steering displacement, there is a different output shaft speed, it being possible, theoretically at least, to attain an infinite number of output shaft speeds by varying the steering displacement by infinitesimal increments. Expressed somewhat differently, the variable speed transmission of the invention thus provides for an infinite number of speed ratios between the speed of the turntable 18 and the speed of the output shaft 46, which is an important feature of the invention.

By steering both of the wheels 58 to move the entire assembly 24 along the guide means provided by the tracks 14 and 16 and the rollers 26 and 28, a very accurate and sensitive response to the steering displacement is attained, the sensitivity and accuracy of response being enhanced by the easy steering resulting from locating the pivot axes of the kingpins 70 at the centers of the tires 62. Steering both wheels 58 and moving the entire assembly 24 transversely of the turntable 18 results in minimum friction, the only friction in the system, aside from the friction between the wheels 58 and the turntable 18, being in the guide means provided by the tracks 14 and 16 and the rollers 26 and 28, and the friction in the external connections to the steering means 92 and the output shaft 46, which may be maintained at a very low level. Tests have shown that the speed of the output shaft 46 is directly proportional to the displacement of the steering means 92 with remarkably little deviation due to friction, the direction of rotation of the output shaft 46 being, of course, dependent on the direction of displacement.

While the invention has thus far been considered as being simply a variable speed transmission wherein the ratio of the speed of the output shaft 46 to the speed of the turntable 18 may be varied in either direction by varying the magnitude and direction of the steering displacement, the invention is capable of performing a wide variety of other functions. For example, it will be apparent that the invention provides a force multiplying device. In other words, since any desired amount of power may be delivered to the turntable 18 to rotate it, the torque output of the shaft 46 may be many times the steering moment resulting from the application of a steering force to the steering arm 94. In other words, a steering moment of a few gram-centimeters, or less, applied to the steering arm 94 may be amplified into a very high torque output at the output shaft 46.

The invention provides a force multiplying device in another sense in that it is capable of converting a very small steering force, e. g., less than a gram, into a very large force in the direction of travel of the assembly 24. For example, the side thrust on the wheels 58 may be as much as 25% of the weight of the assembly 24, or more, so that a minute steering force will produce a very large lateral force in the direction of travel of the assembly 24. Thus, force amplification factors running into many thousands are possible. Many applications of this force amplification are possible, such as in drawing charts by means of a pen connected to the assembly 24, or in opening gates or valves connected to this assembly, to name but a few.

Another application of the variable speed transmission of the invention is that of a transducer for converting the steering displacement into a torque output. More broadly, the invention is capable of converting any variable which is inherently a displacement, or which is capable of conversion into a displacement, into a torque output at the output shaft 46, the displacement inherent in the variable, or the displacement produced by conversion of the variable, being transferred to the steering means 92. Furthermore, as hereinbefore indicated, very small steering forces may be amplified into very large torque outputs. The invention has utility in this sense in any instance where it is desired to convert a variable of small magnitude into a large output force for actuating any desired apparatus, it being apparent that the output torque at the output shaft 46 may readily be converted into an output force by any suitable means connected to the output shaft.

Figs. 5 and 6 illustrate other possible applications of the variable speed transmission of the invention, it being understood, however, that neither the applications hereinabove discussed, nor the applications illustrated in Figs. 5 and 6, are limiting of the possible applications of the variable speed transmission of the invention.

Referring to Fig. 5 of the drawings, the numeral 100 designates generally the variable speed transmission of the invention hereinbefore described, the steering arm 94 being shown as having pivotally connected thereto a link 102 through which a steering force may be applied to the steering arm in either direction. The output shaft 46 of the transmission 100 is shown as connected, through a universal joint 104, to an input shaft 106 of differential gearing 108 having another input shaft 110 and an output shaft 112. With the system of Fig. 5 as thus far described, three different variables may be introduced into the system, one variable being, as hereinbefore discussed, the displacement of the steering arm 94 through the link 102. The second variable, which will also affect the speed of the output shaft 46, may be the speed of the turntable 18. Thus, the speed of the input shaft 106 into the differential gearing 108 is dependent both on the displacement of the steering arm 94 and the rotational speed of the turntable 18. The third variable may be introduced in the form of the rotational speed of the input shaft 110, the speed of the output shaft 112 then being a function of three variables. In other words, the speed of the output shaft 112 is the difference between the speed of the input shaft 106, which is a function of two variables, and the speed of the input shaft 110, which is a function of one variable. A fourth variable may be introduced into the speed of the output shaft 112 by connecting the input shaft 110 of the differential gearing 108 to the output shaft of another variable speed transmission of the invention identical to the variable speed transmission 100. Alternatively, instead of introducing a variable by way of the input shaft 110, the shaft 110 can be driven at a fixed speed so that the speed of the output shaft 112 is a comparison of the speed of the input shaft 106 to the fixed reference speed of the shaft 110, the speed of the shaft 106 depending on the steering displacement and on the turntable speed, as hereinbefore discussed.

By adding to the system of Fig. 5 as thus far described, further torque amplification can be obtained by using the output shaft 112 to displace a steering arm 94a of a variable speed transmission 100a of the invention which is identical to the variable speed transmission 100, the various parts being identified by the same reference numerals with the suffix "a" added thereto. In the particular construction shown, the output shaft 112 is connected to the steering arm 94a by rack and pinion gearing 114, although other connections may be utilized. With this setup, the output torque of the output shaft 46a represents an amplification of the output torque of the output shaft 46.

Other possibilities are to utilize either the transmission 100 by itself, the transmission 100 in connection with the differential gearing 108, or the transmission 100 in connection with the differential gearing 108 and the transmission 100a, in a feedback system wherein the torque output of the shaft 46, the torque output of the shaft 112, or the torque output of the shaft 46a, is fed back to control one of the variables introduced into the transmission 100, such as the displacement of the steering arm 94, for example.

Referring to Fig. 6 of the drawings, the variable speed transmission of the invention, again designated by the numeral 100, is shown in use as an integrator for integrating the weight of material carried by a conveyor means 120 with respect to time, irrespective of variations in the instantaneous load on the conveyor means and the instantaneous conveyor speed. In using the transmission 100 as an integrator under such conditions, the turntable 18 is rotated at a speed proportional to the conveyor speed, as indicated diagrammatically by the broken line connection 122. The conveyor means 120 is provided with a suspended conveyor section, diagrammatically shown at 124, which is connected to the steering means 92, as shown diagrammatically by the broken line connection 126, so that the displacement of the steering means varies with the load on the suspended conveyor section. With this setup, as will be apparent, if the speed of the conveyor increases, the speed of the output shaft 46 is increased, and if the load on the conveyor increases, the speed of the output shaft is also increased due to the action of the steering means 92 hereinbefore discussed. Thus, the total number of revolutions of the output shaft 46 during any predetermined time interval is a measure of the total amount of weight of material transported by the conveyor means 120 during such time interval, and this may be indicated by any suitable means connected to the output shaft 46, such as a counter 128.

In addition to being connected to the counter 128, the output shaft 46 may be connected to a suitable feeding means, not shown, for feeding material to the conveyor means 120, as by connecting the shaft 46 to such feeding means through a differential gearing similar to the differential gearing 108 hereinbefore discussed. With such a setup, the output shaft 46 would be connected to the input shaft 106 of the differential gearing 108 and the output shaft 112 would drive the feeding means, the input shaft 110 being rotated at a constant speed as a reference to insure feeding a constant rate of material to the conveyor means 120, this being an example of the feedback system hereinbefore mentioned. With such a setup, any deviation in the weight on the conveyor means from the desired weight thereon would be compared to the fixed reference, represented by the speed of the input shaft 110, and any deviations would result in a change in the rotational speed of the shaft 112 to correct the feeding rate of the feeding means, the speed of the shaft 112 varying inversely with the load on the conveyor.

Numerous other applications of the invention are also possible.

Although I have described exemplary embodiments of my invention herein for purposes of illustration, it will be understood that various changes, modifications and substitutions may be incorporated in such embodiments without departing from the spirit of the invention.

I claim as my invention:

1. In a variable speed transmission, the combination of: a rotor; a differential housing; differential gearing in said differential housing and having two input shafts and an output shaft; means for guiding said differential housing for movement transversely of said rotor; two steerable wheels pivotally mounted on said differential housing and at least one engaging said rotor; two shaft means respectively connecting said steerable wheels to said input shafts, each of said shaft means having an axially slidable connection with the corresponding input shaft and having therein a universal joint in alignment with the pivot axis of the corresponding steerable wheel; and means for steering said steerable wheels.

2. A variable speed transmission as defined in claim 1 including means connected to said output shaft and driven thereby.

3. In a variable speed transmission, the combination of: a frame; a rotor mounted on said frame; a differential housing; differential gearing in said differential housing and having two input shafts and an output shaft, said input shafts having a common input shaft axis perpendicular to and intersecting the axis of rotation of said rotor; means on said frame and said differential housing for guiding said differential housing for transverse movement with respect to said rotor along said input shaft axis; two steerable wheels pivotally mounted on said differential housing and engaging said rotor on opposite sides of the axis of rotation thereof; two shaft means respectively connecting said steerable wheels to said input shafts, each of said shaft means having an axially slidable connection with the corresponding input shaft and having therein a universal joint in alignment with the pivot axis of the corresponding steerable wheel; and means for steering said steerable wheels.

4. A variable speed transmission as defined in claim 3 including means connected to said output shaft and driven thereby.

5. A variable speed transmission as defined in claim 3 wherein said rotor is a disc.

6. A variable speed transmission as defined in claim 3 wherein said rotor is a plane disc having a vertical axis of rotation.

7. A variable speed transmission as defined in claim 3 wherein said steering means includes means for toeing said wheels in toward each other.

8. A variable speed transmission as defined in claim 3 wherein said guiding means includes track means on said frame and track follower means on said differential housing.

9. A variable speed transmission as defined in claim 3 wherein said wheels have central planes and are mounted on said differential housing for pivotal movement about pivot axes respectively disposed in said central planes and intersecting the axes of said shaft means, respectively.

10. In combination: a first variable speed transmission including a frame, a rotor mounted on said frame, a differential housing, differential gearing in said differential housing and having two input shafts and an output shaft, said input shafts having a common input shaft axis perpendicular to and intersecting the axis of rotation of said rotor, means on said frame and said differential housing for guiding said differential housing for transverse movement with respect to said rotor along said input shaft axis, two steerable wheels mounted on said differential housing and engaging said rotor on opposite sides of the axis of rotation thereof and respectively connected to said input shafts, and means for steering said steerable wheels; a second variable speed transmission identical to said first variable speed transmission; a third differential gearing having two input shafts and an output shaft; means connecting said output shaft of said first variable speed transmission to one of said input shafts of said third differential gearing; means for rotating the other input shaft of said third differential gearing; and means connecting said output shaft of said third differential gearing to said steering means of said second variable speed transmission.

11. In combination: a first variable speed transmission including a frame, a rotor mounted on said frame, a differential housing, differential gearing in said differential housing and having two input shafts and an output shaft, said input shafts having a common input shaft axis perpendicular to and intersecting the axis of rotation of said rotor, means on said frame and said differential housing for guiding said differential housing for transverse movement with respect to said rotor along said input shaft axis, two steerable wheels mounted on said differential housing and engaging said rotor on opposite sides of the axis of rotation thereof and respectively connected to said input shafts, and means for steering said steerable wheels; a second variable speed transmission identical to said first variable speed transmission; and means for connecting said output shaft of said first variable speed transmission to said steering means of said second variable speed transmission.

12. In combination: a variable speed transmission including a rotor, a differential housing, differential gearing in said differential housing and having two input shafts and an output shaft, means for guiding said differential housing for movement relative to said rotor, two steerable wheels mounted on said differential housing and at least one engaging said rotor, said steerable wheels being connected to said input shafts, respectively, and means for steering said steerable wheels; and another differential gearing having two input shafts and an output shaft, one of said input shafts of said other differential gearing being connected to said output shaft of said variable speed transmission.

13. In combination: a variable speed transmission including a rotor, a differential housing, differential gearing in said differential housing and having two input shafts and an output shaft, means for guiding said differential housing for movement relative to said rotor, two steerable wheels mounted on said differential housing and at least one engaging said rotor, said wheels being connected to said input shafts, respectively, and means for steering said wheels; and feeding means for bulk material connected to said output shaft.

14. In combination: a variable speed transmission including a rotor, a differential housing, differential gearing in said differential housing and having two input shafts and an output shaft, means for guiding said differential housing for movement relative to said rotor, two steerable wheels mounted on said differential housing and at least one engaging said rotor, said wheels being connected to said input shafts, respectively, and means for steering said wheels; feeding means for bulk material; and a driving connection between said feeding means and said output shaft.

15. A combination as defined in claim 14 including conveyor means responsive to the weight of material thereon and including means connecting said conveyor means to said steering means of said variable speed transmission.

16. A combination as defined in claim 14 wherein said driving connection includes another differential gearing having two input shafts and an output shaft, one of said input shafts of said other differential gearing being connected to said output shaft of said variable speed transmission, and said output shaft of said other differential gearing being connected to said feeding means.

17. A combination as defined in claim 14 wherein said rotor is a disc having its axis of rotation between said steerable wheels, both of which engage said disc.

18. A combination as defined in claim 12 including feeding means connected to the output shaft of said other differential gearing.

19. A combination according to claim 18 including means for rotating the other input shaft of said other differential gearing at a substantially constant speed.

20. A combination as defined in claim 19 including conveyor means receiving material from said feeding means, said conveyor means being provided with a weighing section connected to said means for steering said steerable wheels.

21. A combination according to claim 20 including means for rotating said rotor at a substantially constant speed.

References Cited in the file of this patent

UNITED STATES PATENTS

| | | |
|---|---|---|
| 1,172,503 | Trufant | Feb. 22, 1916 |
| 2,218,434 | Neuhaus | Oct. 15, 1940 |
| 2,533,710 | Biehler | Dec. 12, 1950 |
| 2,627,434 | Harper | May 5, 1953 |

FOREIGN PATENTS

| | | |
|---|---|---|
| 18,761 | Great Britain | Aug. 16, 1912 |
| 588,294 | France | Jan. 29, 1925 |